March 15, 1932.　　　F. W. YOUNG　　　1,850,044
FILTER
Filed Aug. 23, 1928　　　5 Sheets-Sheet 1

Inventor
Frank W. Young
By his Attorneys
Bohleber & Ledbetter

March 15, 1932. F. W. YOUNG 1,850,044
FILTER
Filed Aug. 23, 1928 5 Sheets-Sheet 2
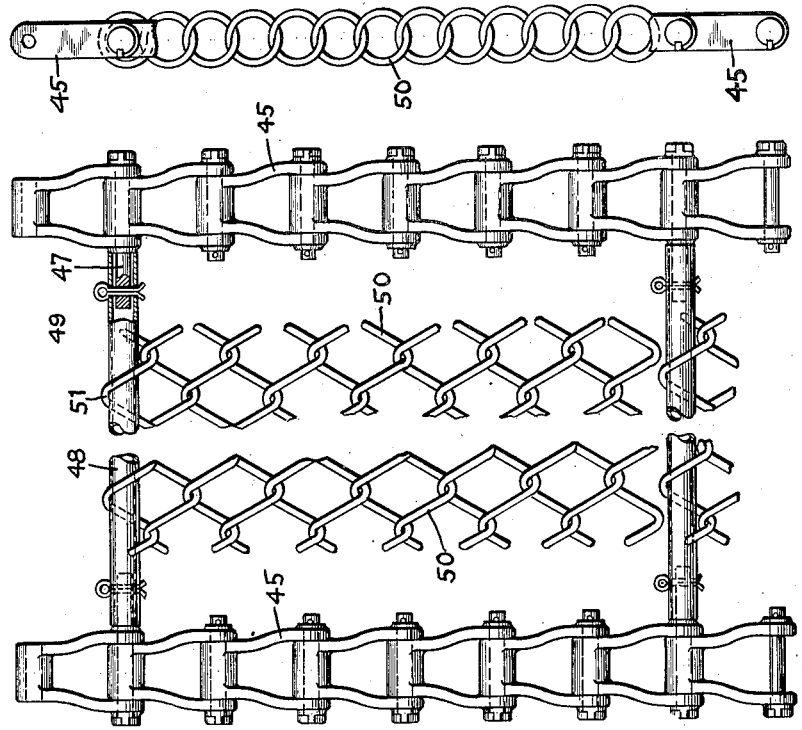
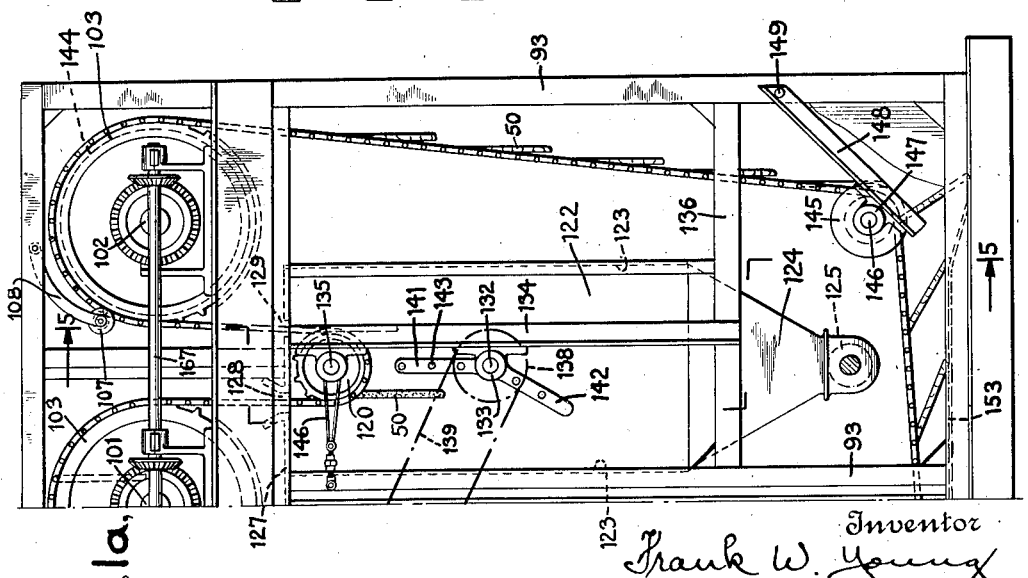
Inventor
Frank W. Young
By his Attorneys March 15, 1932.  F. W. YOUNG  1,850,044
FILTER
Filed Aug. 23, 1928    5 Sheets-Sheet 3

Inventor
Frank W. Young
By his Attorneys
Bohleber & Seahettee

March 15, 1932.     F. W. YOUNG     1,850,044
FILTER
Filed Aug. 23, 1928    5 Sheets-Sheet 4
FIG. 5,
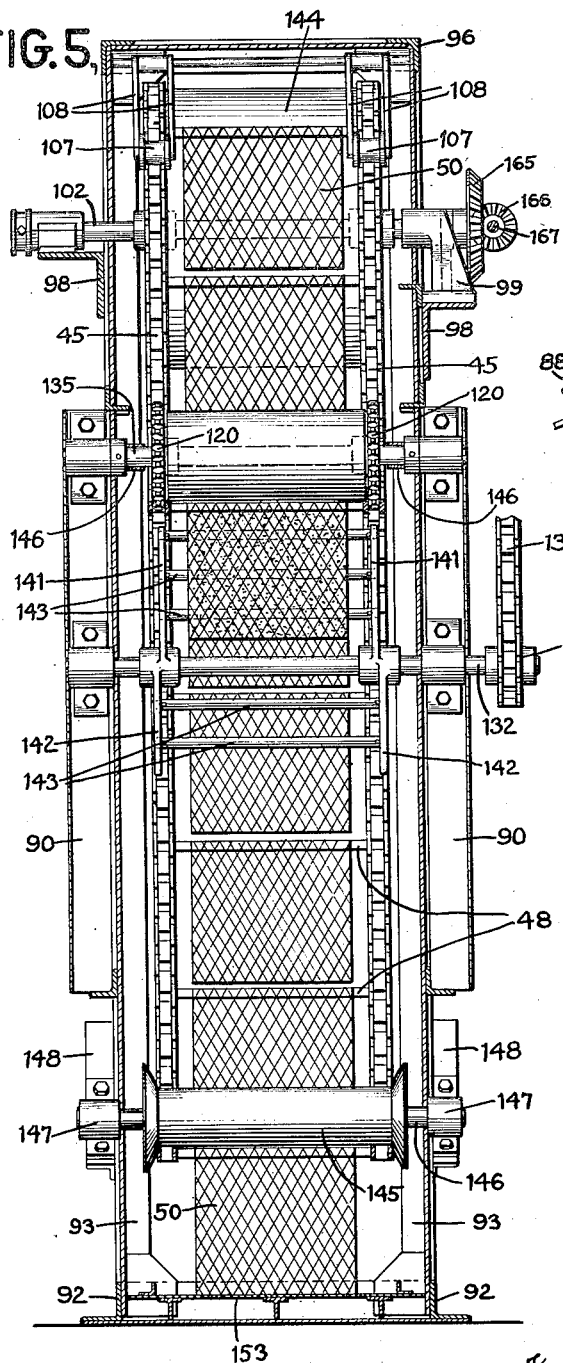
FIG. 6,
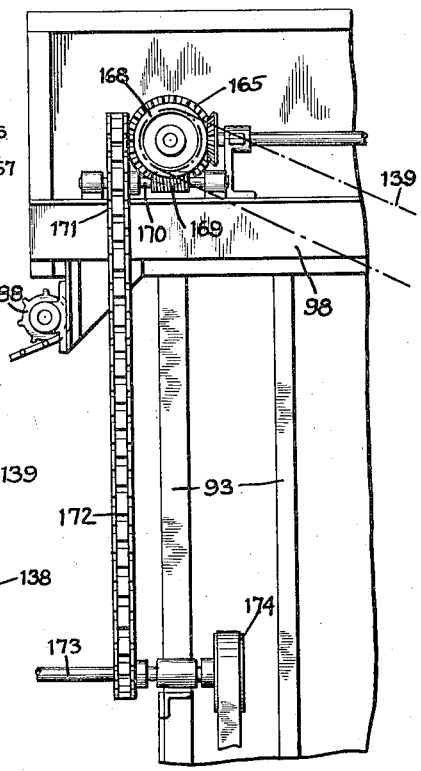
FIG. 7,
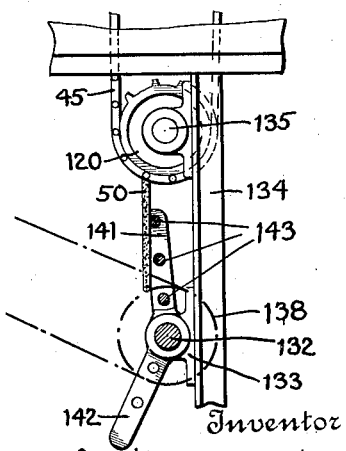
Inventor
Frank W. Young
By his Attorneys
Bohleber & Leadetter March 15, 1932. F. W. YOUNG 1,850,044
FILTER
Filed Aug. 23, 1928   5 Sheets-Sheet 5
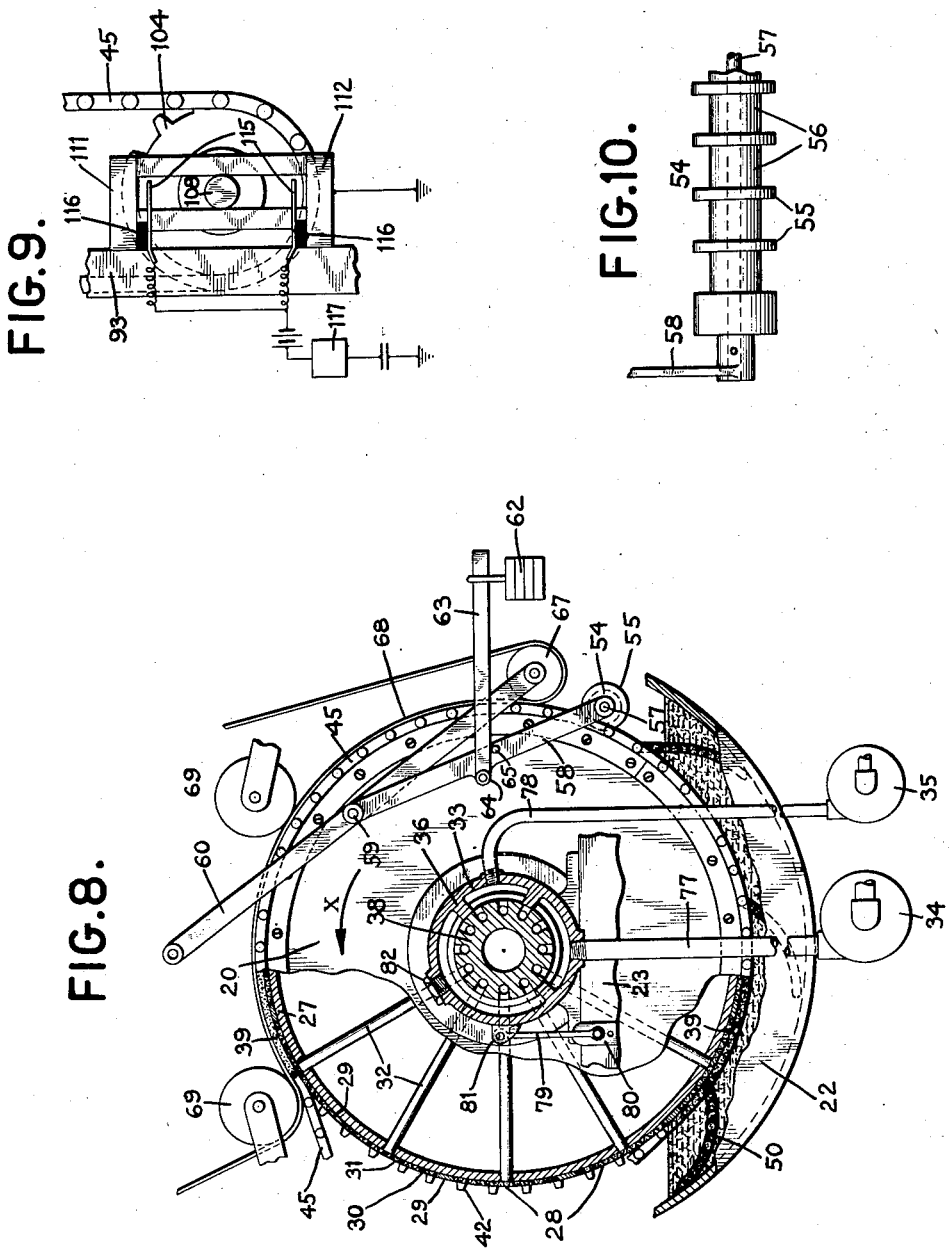

Patented Mar. 15, 1932

1,850,044

UNITED STATES PATENT OFFICE

FRANK W. YOUNG, OF VERONA, NEW JERSEY

FILTER

Application filed August 23, 1928. Serial No. 301,647.

This invention relates broadly to devices for handling solids from which moisture or liquids is or are to be separated. More particularly, the invention relates to the recovery of solids from a liquid in which they are suspended and their subsequent treatment.

In Patent No. 1,472,574 to Arthur Wright and Frank W. Young there was disclosed a reenforcement for filter cake comprising a screen-like member, which was caused to be embedded in filter cake through the instrumentality of a rotary drum type filter about which the reenforcement in the form of an endless belt was directed and by which the filter cake could be stripped from the filter cloth. From the filter, in one embodiment, the filter cake was conveyed to and into a treating chamber. It has heretofore been proposed to cause the mesh reenforcement of, say, spirally woven wire to travel gradually through the treating chamber until the cake reenforced thereby had been subjected to the desired treatment. In situations where the treatment effected the drying of the filter cake, it was the practice to retain the reenforcement laden with filter cake within the treating chamber for an appreciable length of time, say several hours, and, because of the fact that a filter drum normally makes a revolution in from one to three minutes, an exceptionally long reenforcing belt was necessary which was caused to gradually progress through the treating chamber, but in the form of festoons. Due to the easily disruptable nature of the filter cake it was rarely possible to cause the reenforcement to assume a circuitous path through the treating chamber, because any reverse bend of relatively short radius in the reenforcement causes the filter cake to break away from the reenforcement, to some extent at least. Such a construction, therefore, did not permit a positive drive of the reenforcement by or from the filter drum and it was therefore required to provide devices to synchronize the movements of the filter and the devices conveying the festoons of reenforcement laden with filter cake through the treating chamber.

It is a primary object of this invention to provide a reenforcement for filter cake or the like which is capable of travelling over a circuitous path having relatively sharp reverse bends without dislodging its burden. Accordingly, the reenforcement is divided up into a plurality of relatively independent sections, each of which is capable of remaining in an undistorted condition throughout its travel.

It is also an object of this invention to provide means for conveying a sectionated reenforcement over a circuitous path through a treating chamber, such as a dryer, in a manner to be synchronized with the filter drum and be directly driven therewith. To this end, the sections of filter cake reenforcement are relatively movable with respect to an endless belt which is caused to travel in a circuitous path and, if desired may be driven by devices which are coupled with the filter drum. Preferably, sections of the reenforcing medium are suspended between spaced chains travelling over sprockets in the treating chamber driven synchronously with the filter drum and the sections are pivotally mounted thereon so as to be capable of relative movement with respect to the chains and to each other whereby each section may not be distorted but may lie substantially in a plane throughout its travel.

Another object of the invention is the disposition of the heating elements within a treating chamber whereby a saving of heat units may be effected. Accordingly, the heating elements are so disposed with respect to the air inlet, the entrance for the reenforced filter cake and the circuitous path of the reenforcement that the warmed air is caused to travel counter-current to the direction of travel of the filter cake.

This invention also has to do with a means for associating the reenforcement with the filter cake as it is formed on the filter. Accordingly, if desired, the sections of mesh reenforcement may be forced into the filter cake after it is formed upon the drum and prior to compression by a compression belt.

A further object of the invention is the provision of means to free the filter cake from the reenforcement after it has been suitably treated or dried. To this end, rotatable arms are provided adapted to strike a section of reenforcement laden with filter cake as it is suspended from the chains and distort said section and thus break the bond between the cake and the reenforcement.

The invention also resides in a practical instrumentality by which the invention may be realized.

These and other objects of the invention and the means for their attainment will be more apparent from the following detailed description, taken in connection with the accompanying drawings illustrating one embodiment by which the invention may be realized, and in which:

Figure 1a is a fragmentary view, in side elevation, showing the end of the treating chamber of Figure 1 remote from the filter, the side walls of which are removed to show means whereby the filter cake is removed from the reenforcement.

Figure 2 shows a fragmentary portion of the filter cake reenforcement.

Figure 3 is a view showing one of the filter cake reenforcement sections looking from the left in Figure 2, links of the chain being broken away in the interest of clearness.

Figure 5 is a section taken on the broken line 5—5 of Figure 1a and looking in the direction of the arrows and showing particularly the beaters adapted to free the filter cake from the reenforcement.

Figure 6 is a fragmentary view showing a portion of the drive for the filter cake reenforcement at the front end of the treating chamber proximate the filter.

Figure 7 is a detail view in side elevation, showing the means for freeing the filter cake from the reenforcement.

Figure 8 is an elevational view of the filter looking at the side opposite to that in Figure 1, parts being removed to show the construction of the filter.

Figure 9 is a fragmentary view showing one of the lower or floating bearings for the weighted shafts carrying the sprockets about which are directed the endless chains bearing the sections of filter cake in their travel through the treating chamber and showing also indicating means susceptible to extreme position of the shafts resulting from improper condition of the chains.

Figure 10 is a fragmentary view of the weighted roller adapted to force the reenforcement sections into the filter cake on the filter drum.

Figure 1:
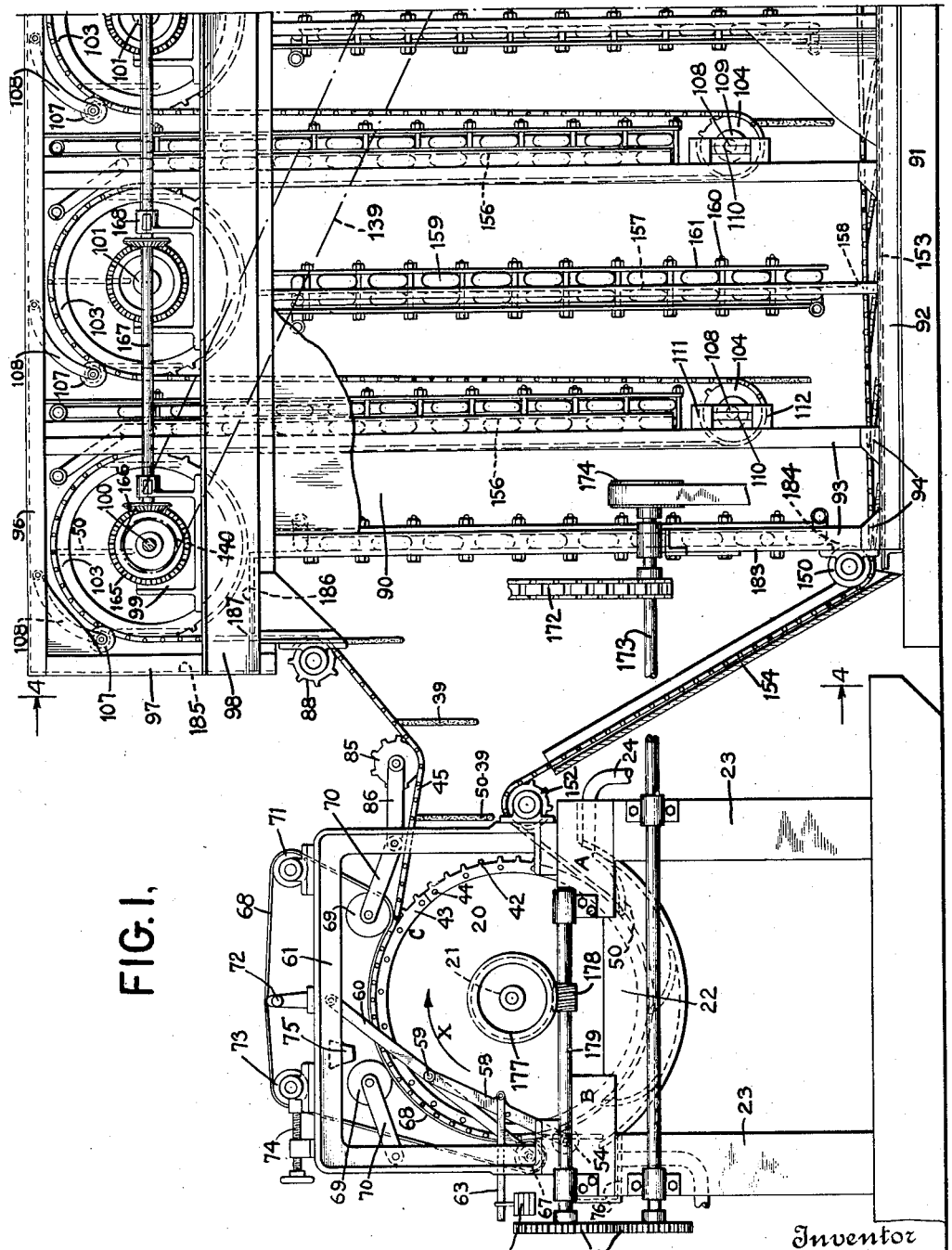
Figure 1 is a view in side elevation showing a rotary drum type filter and the adjacent end of a treating chamber adapted to be associated therewith, in accordance with this invention, parts being broken away in the interest of clearness.

While there has been illustrated in Figure 1 a filter of the rotary drum type, it will be obvious, as the description proceeds, that the invention is equally applicable to any instrumentality adapted to cause the formation of a deposit on a surface by the migration thereto of particles in suspension in a liquid. As illustrated, the filter drum 20 is journalled as at 21 to rotate in a tank 22 of slurry, the tank being supported in any convenient fashion as by the frame 23, and the slurry being preferably pumped thereinto through the pipe 24. The filter drum 20 may be of any well known type, but is preferably of the sectionated type, that is, as shown in Figure 8, the periphery 27 of the filter drum 20 is separated into a plurality of drainage recesses 28 by transversely extending partitions 29 and the filter medium or filter cloth 30 is supported over the recesses 28 by any convenient type of drainage member permitting flow of filtrate away from the filter cloth 30, such as the woven wire spacing element 31. Each of the drainage recesses 28 is connected by filtrate drain pipes 32 to a valve 33 in communication with sources of low and high vacuum such as the suction pumps 34 and 35 shown in Figure 8.

Any convenient vacuum controlled valve is applicable. In the illustrated embodiment a filtrate collecting ring of a suitable valve is shown at 38 which regulates the application of the vacuum to the various compartments of the filter drum, for instance, as the drum rotates in the direction of the arrow X. In the operation of the filter the valve ring 36 may connect those drainage chambers 28 in the cake forming zone (between points A and b) with say the source of low vacuum 34 such that a suction equivalent to fifteen inches of mercury, for instance, may be applied to the filter cloth to cause the building up of the filter cake 39 thereon.

Travelling with the filter drum is the filter cake reenforcement forming one aspect of this invention. Suitably spaced, say adjacent the sides of the drum 20, are sprocket teeth 42. These sprocket teeth 42 are preferably carried upon a split ring 43 suitably secured, as at 44, to the sides of the filter drum 20. Two chains 45 travelling in parallel relationship respectively engage the sprocket teeth 42 and the respective links of the chain 45 are secured together in any suitable fashion, as by pivots. At predetermined intervals the pivotal connections are replaced by pivot pins 47 having increased length extending inwardly and serving as bearings or supports for pivot sleeves 48 to which they are connected as by the cotter pins 49. Suspended from each of these pivot sleeves 48 and occupying the space between the respective chains 45 is a section of mesh reenforcement 50. This reenforcement preferably takes the form of helically wound woven wire screening and the sleeve 48 is passed through the convolutions 51 along one edge, so that the section 50 is loosely and pivotally supported thereby.

The chains 45 encircle the drum as shown in Figure 1. In the zone of cake formation or filtration, that is, between the points A and B, the reenforcing sections 50 are suspended in the slurry and because of their length, in the illustrated embodiment, are dragged along on the interior surface of the tank 22 and thus may effect a degree of agitation of the slurry. During this period the filter cake 39 builds up on the filter cloth 30 between the chains 45, the filtrate being drawn through the filter cloth and drawn off through the drain pipes 32. As the drum rotates in the direction of the arrow X the filter cake 39, which has been formed on the drum, is carried upwardly out of the slurry in the tank 22 and beneath a counter-weighted roller 54, as shown. This roller, as shown in Figure 10 preferably takes the form of a plurality of separate rollers 55 spaced from one another by sleeves 56 on a shaft 57 which extends between the lower ends of a pair of links 58. These links 58 are pivoted at their upper ends, as at 59, to links 60 which are pivotally supported from the compressor belt frame 61 carried with the frame 23 of the tank 22. As the flexible sections 50 travel upwardly beneath the roll 54 they are pressed into the filter cake 39 so as to be embedded therein and thereby reenforce the filter cake, as will be more apparent hereinafter. The pressing action of roll 54 is amplified by means of the counterweight 62 which is carried on the end of arms 63 extending outwardly from the links 58 to which they are secured so that the downward tendency of the weight 62 under the influence of gravity tends to rotate the links 58 in a counter-clockwise direction (Fig. 1) about the pivots 59. The arms 63 are conveniently pivoted as at 64 to the links 58 and relative downward movement with respect to the links 58 is prevented by stops 65 on the links. By these pivotal connections the utmost freedom of movement is permitted so that all parts associated with the links 60 may be swung outwardly to gain access to the filter. As the drum continues to rotate in a clockwise direction the filter cake 39 now reenforced by the mesh sections 50 is carried beneath the roller 67 journalled in the end of the links 60. This roller is located as far down on the drum periphery as possible and applies an initial compression to squeeze out moisture and rid the surface of the cake of sloppy material loosely held thereon.

Roller 67 forms one of a plurality of rollers journalled in frame 61 about which an endless compressor belt 68 is directed, the compressor belt being also directed about the weighted compressor rolls 69 which are pivotally mounted, as by arms 70, to the frame 61 to compress the cake and iron it out and close any fissures formed therein which might permit the passage of air therethrough. While under the compressor belt 68 say between the points B and C the cake is preferably subjected to an increased suction which draws out moisture squeezed out of the voids of the cake by the belt. The belt 68 then passes about a stationary roller 71. The belt 68 is smoothed or ironed out after it leaves the roll 71 by means of an ironer bar 72 and is straightened and maintained to the proper degree of tension by the roll 73 adjustable by the hand screws 74 at either end.

By means of the compressor belt 68 the cake 39 is compressed, rendered homogeneous and less porous and accordingly more firmly anchored to the reenforcing and stripping member 50. Furthermore considerable of the liquid will be removed from the cake and drawn into the drum as the vacuum is still maintained on the compartments directly under the compression apparatus. If desired the cake may be washed by wash water delivered from a trough 75 or other water delivery means and flowing down over and through the belt 68, excess water being caught in the trough 76 on the tank frame 23. As the drum 20 is rotated and the particular portion of the filter cake 39 approaches that point at which it is to be removed from the filter medium 30 the vacuum is relieved as in standard practice, since without the relief of the vacuum the filter cake 39 will be held to the cloth 30 by the vacuum with greater force than the bond between the cake and the reenforcing members. Such a vacuum controlled valve is indicated at 33 in Figure 8. The filtrate collecting ring 36 regulates the application of the vacuum to the various compartments 28 of the filter drum 20 and the break-off of the vacuum as each compartment reaches the point of discharge of the cake is indicated at C. The drain lines or vacuum passages 32 leading from the vacuum recesses 28 beneath the filter cloth 30 terminate beneath this collecting ring 36 which serves as an adjustable connection between the said vacuum passages and source of high and low vacuum. The low vacuum source is in communication with the valve ring by the pipe connection 77 and the high vacuum source is in communication with the valve ring by the pipe connection 78. The adjustment of the valve ring for the purpose of determining where filtration begins and where the filter cake is subjected to a higher vacuum beneath the compressor belt and where discharge is effected is obtained by the adjustment of the filter ring 36 by means of the adjusting or valve anchor rod 79 adjustably secured at its one end to a plate 80 on the frame 23 of the slurry tank 22 and connected at its other end to ears 81 on the filter collecting ring 36. The vacuum release or air vent is illustrated by the aperture 82.

The filter cake after it is dewatered, washed and compressed beneath the compressor belt 68 becomes compacted within the interstices and about the helices of the reenforcement sections 50 and is capable of being stripped from the filter cloth 30 and carried away thereby upon the relief of the vacuum as just described. From the filter drum 20 the chains 45 carrying the sections are directed about idler sprockets 85 which are respectively pivotally supported at the ends of arms 86 from the compressor belt frame 61. These sprockets 85 are weighted and are adapted to take up any slack in the chains 45. As the chains 45 leave the drum 20 at the point C the sections 50 of reenforcement now laden with filter cake 39 are suspended vertically as shown.

The drying or treating chamber 90 is illustrated as a generally box-like housing formed of frame members, conveniently angle irons, which are suitably covered on all sides to form a substantially air-tight chamber. Resting upon any suitable support or base 91 are longitudinally extending angle irons 92 and the side members 93 of the frame, also preferably angle irons, are conveniently secured thereto, as by the gusset plates 94. Similarly, angle irons 95 form cross frame members to support the roof and the tops of the side frame members 93 are positioned by longitudinally extending angle irons 96 as clearly shown in Figure 5.

For convenience in description, the end of the treating chamber proximate the filter will be referred to as the front end and the end of the treating chamber remote from the filter will be referred to as the rear end.

It will be noted upon reference to Figure 1 that the front end of the upper portion of the treating chamber overlaps or extends outwardly over the front end uprights 93 and is defined by short upright angle irons 97 which are suitably supported by horizontal angle irons 98, extending the length of the treating chamber. The cake reenforcement laden with filter cake enters the treating chamber through an entrance in the bottom of the overhanging portion being directed thereinto by idler sprockets 88 carried at the front end of the chamber. The angle irons 98 form shelves to support brackets 99 in which are journalled shafts 100, 101, 102 reading from left to right in Figures 1 and 1a. The shafts 100, 101 support sprockets 103 about which the chains 45 are directed to take a vertical direction within the treating chamber 90. From each of the top sprockets 103 the chains are directed downwardly to bottom sprockets 104. The sprockets 103 are spaced from one another on the shafts 100 and 101 and are of sufficient radius to permit the sections of filter cake reenforcement 50 to hang downwardly as they pass across above the shafts 100 and 101, as the sprockets rotate as shown clearly in Figure 4. Thus the sections 50 pass without obstruction across the top of the shaft and at all times hang vertically, that is from the time they leave the filter 20 during the generally upward travel thereof to the sprockets 88 and the vertical travel to the sprockets 103 and still hang vertically during their downward movement to the bottom sprockets 104, this by reason of the pivotal mounting of the sections 50 along one edge 51 on the connecting sleeves 48 which extend between the chains 45.

As the links of the chains 45 are sometimes poorly matched or become distorted in use despite all precautions they sometimes disengage themselves from or fail to mesh with the teeth of the sprockets 103. To prevent this or cause them to register, a weighted flanged wheel 107 having the general shape of a pulley is carried upon the end of an arm 108 pivotally mounted in the top of the chamber and rests upon and guides and holds the links of each chain in mesh with the teeth of the respective sprockets 103.

From the sprockets 103 the chains 45 travel in a generally vertical and downward direction to bottom sprockets 104 carried upon transverse shafts 108. The shafts 108 are preferably weighted as at 109 and are mounted in floating bearings 110 so as to be vertically slidable between abutments 111 and 112 carried, say, on vertical side frame members 93 of the chamber 90. Thus, if for any reason there is an irregularity in the travel of the chain or a temporary shortening caused by a stoppage or retardation at some point the shaft 108 affected will move upward slightly to compensate for the change in the length of the chains 45. On the other hand the chains are kept constantly taut by the tendency of the weights 109 to seek the lowermost position permitted by the length of the reaches of chain in contact therewith.

In the event that the chain breaks or hangs with too much slack about one of the sprockets 104 on sprocket shaft 108, the shaft obviously falls to the lowermost position and rests upon the abutment 112. If a serious stoppage occurs the shaft will, conversely, be drawn upwardly by the chain and strike the top abutment 111. In these extreme positions it is imperative that the operation of the apparatus be stopped at once or at least that attention be directed to the difficulty in order that an attendant may rectify the same. To this end, the upper and lower abutments as shown somewhat schematically in Figure 9 are provided with, say, leaf spring contacts 115, insulated as by means of blocks 116 of dielectric material from the abutments 111, 112 respectively, and connected in series with an alarm as shown at 117 or with circuit breaking apparatus for the motor 26 driving the chain. The return circuit is grounded on the apparatus, as shown, so that if the shaft 108 raises or lowers beyond a predetermined degree it will strike one of the contacts 115 and cause it to contact with one of the abutments 111 or 112 thus completing the circuit.

Two lower sprockets 104 are illustrated receiving and again returning the chains 45 to the first three of the series of four top sprockets 103. Obviously any number of sprockets 103, 104, may be included as is found desirable, as long as a series of these sprockets 103 and 104 are disposed respectively at the top and bottom of the treating chamber 90 whereby the chains are caused to travel in a circuitous path up and down through the chamber from end to end while the sections of reenforced filter cake hang vertical at all times, the sprockets 104 being disposed sufficiently above the floor of the chamber to permit the reenforcing sections 50 to hang vertically as the chains pass across beneath the shafts 108.

At the rear end of the treating chamber remote from the filter and between the last two upper sprockets 103 the chain passes downwardly around sprockets 120 carried on a fixed shaft 135 which is disposed relatively high up in the chamber 90. The reenforcing sections 50 are freed from their burden of filter cake as they hang downwardly from the chains 45 passing about these sprockets 120 by means of beaters now to be described.

Figure 4:
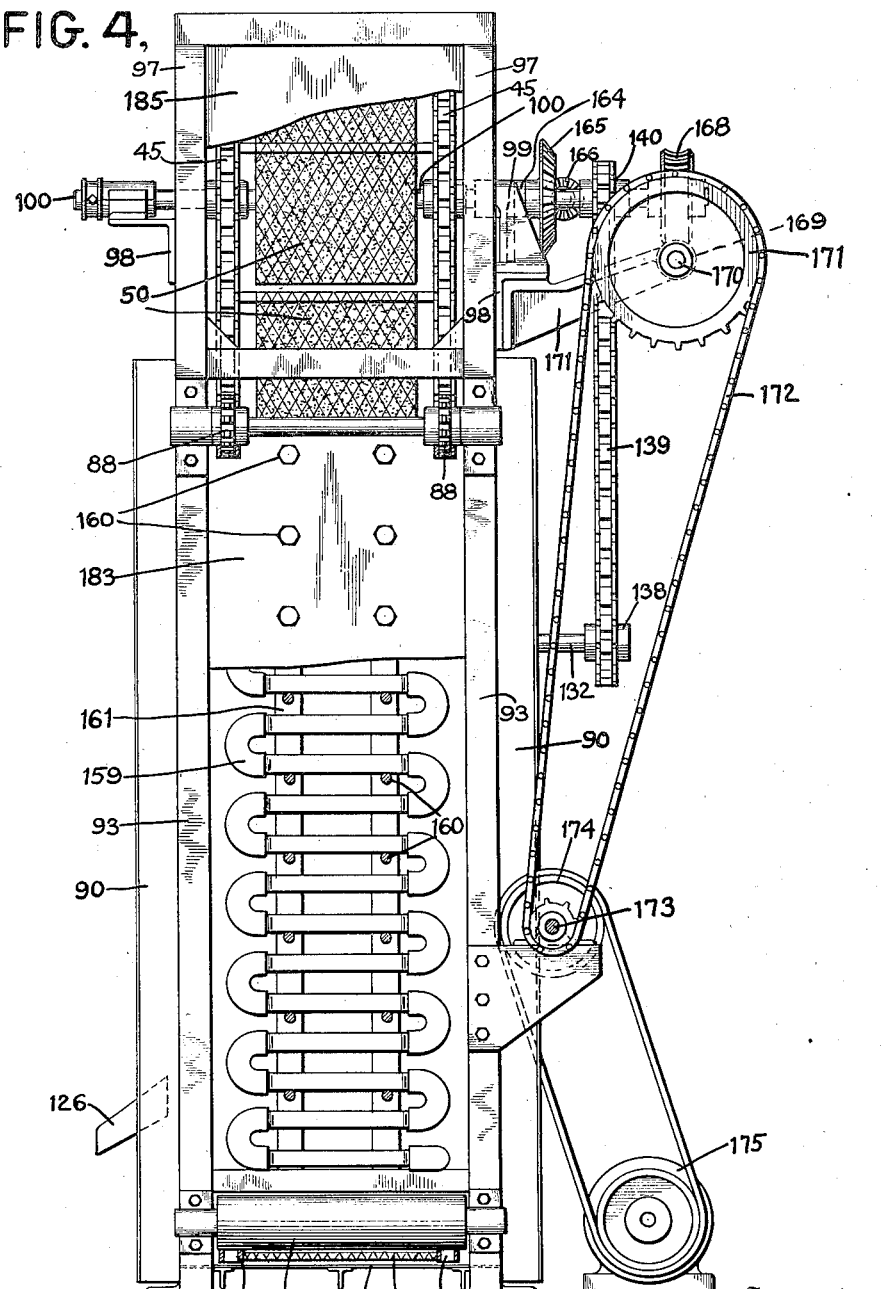
Figure 4 is a view in elevation showing the front end of the treating chamber or end proximate the filter, taken in the plane indicated by the line 4—4 in Figure 1 and looking in the direction of the arrows, the front walls being broken away in the interest of clearness.

The beaters and sprockets 120 are disposed within a chamber or chute 122 formed by the side walls of the chamber 90 and by transverse vertical walls 123 terminating below in a hopper 124 which may empty into an Archimedean screw conveyor 125 delivering the freed and/or treated filter cake 39 in fragmentary form to a discharge chute 126 in the side wall of the treating box shown in Figure 4. The top of the chute 122 is closed by the top 127 as shown and is provided with an inlet opening 128 for the entrance of the chains 45 carrying the reenforcing sections 50 laden with filter cake 39 and an outlet opening 129 for the exit of the chains 45 carrying the sections 50 freed of filter cake. The beaters are carried upon a transverse shaft 132, conveniently carried in bearings 133 on short vertical side frame members 134 which may also carry the fixed lower sprocket shaft 135 and which frame members 134 may be supported in any convenient fashion as by longitudinal side frame members 136 extending between the vertical angle frame members of the chamber. The shaft 132 carries a sprocket 138 outwardly of the chamber 90 which may be driven, as by a chain 139, from a sprocket 140 carried say on the driven shaft 100. Obviously, separate power means may be availed of to drive shaft 132. The shaft 132 may be provided with spaced arms 141, 142 on each side of the chamber 90, the longer arm 141 and the shorter arm 142 on each side preferably being in the form of bell cranks. Beater rods 143 extend between the arms respectively. These beater rods 143 are so positioned on the arms 141 and 142 as to strike the sections of reenforced filter cake 50, 39 as they hang downwardly as the chains 45 pass around the lower circumference of the sprockets 120 and cause these reenforcement sections 50 to whip and the relative movement of the respective coils of the mesh free the filter cake therefrom. As illustrated, the shorter arms 142 are provided with two beater rods 143 extending transversely therebetween while the longer arms 141 carry three beater rods 143. The uppermost one of the beater rods on arms 141 is at a greater distance from the shaft 132 than the remote rod on the shorter arm 142. Thus the beater rods as they rotate rapidly alternately strike the reenforced filter cake at different points thereon and cause the reenforcements to undulate because of the impact at different points, and the filter cake drops in fragments into the hopper 124 at the bottom of the chute 122.

The shaft 135 is conveniently provided with an adjustable friction brake 146 to keep the sprockets 120 from over-running and thus performs substantially the same function as the weighted shafts 108 in floating bearings which carry the sprockets 104.

From the sprocket wheels 120 the chains 45 pass over the last upper sprocket wheels 103 in the upper series, that is, the sprocket wheels on the shaft 102 most remote from the filter 20 and then downwardly for the return flight to the filter drum as shown in Figure 1a. During the beating of the mesh reenforcements 50 to free them of filter cake 39 they are sometimes wound around the pivot sleeves 48 and in order to unwind them so that they will again hang freely the last sprocket shaft 102 is provided with a drum 144 between the sprockets 103. Thus the belt sections, instead of hanging vertically between the last sprocket wheels 103 lie on the peripheral surface of the drum 144 and as they reach the rear side thereof fall over in a clockwise direction about their pivots 48 and thus unwind.

From the sprockets on shaft 102 the chains 45 are directed about a weighted idler roll 145 carried by a shaft 146 journalled in bearings 147 on the ends of arms 148 pivoted as at 149 to the frame members 93 forming the corners of the treating chamber 90. From the idler roll 145 the chains 45 are directed in a substantially horizontal flight to an idler roller 150 journalled on the outside of the front end of the chamber 90 proximate the filter 20. From the roller 150 the chains are directed upwardly to sprockets 152 journalled in brackets on the compressor belt frame 61 from whence they are directed to the sprockets 42 on the drum 20. Along the bottom of the treating chamber the reenforcement sections 50 now freed from filter cake drag along on the bottom of the chamber and to facilitate their movement and reduce wear as much as possible the bottom of the chamber 90 may be provided with a sheet iron plate or floor 153. Similarly a pan 154 may extend between the idler roll 150 and the sprockets 152, closely positioned with respect to the path of travel of the chains to straighten out the belt sections just before they are again on the filter.

The treating chamber is subdivided with a plurality of transverse partitions terminating alternately short of the bottom and top, respectively and denoted for convenience upper partitions 156 and lower partitions 157. Thus the first partition 156 proximate the filter drum extends from the roof downwardly to a point just above the sprocket 104 while the next adjacent partition 157 extends from the bottom of the chamber 90 to a point just below the second sprocket 103, the bottom of the partition 157 being provided with a slot or passage 158 for the return reach of the chains 45. Similar partitions are provided between each pair of corresponding sprockets so that air which may be drawn in at the rear of the treating chamber 90 is caused to take a circuitous path counter-current to the direction of travel of the endless chains 45.

If desired, heating coils 159 may be disposed upon opposite sides of each partition 156, 157 within the treating chamber 90 to which partitions they are secured and supported by bolts 160 passing through the partitions and retaining the heating coils by means of vertically extending metallic strips 161. Thus each coil is closely proximate a reach of chain carrying filter cake.

All of the sprockets over which the chains 45 travel are positively driven in synchronism with the filter drum 20. To this end the shafts 100, 101, 102 carrying the sprockets 103 extend outwardly through the side walls of the treating chamber 90 and are journalled in bearings 164 therewithout supported from suitable longitudinally extending angle pieces 98 carried outwardly of the upright frame members 93. On one side of the chamber 90 the shafts 100 carry bevelled gears 165 which mesh with bevelled pinions 166 preferably carried upon a longitudinally extending driven shaft 167 carried in bearings 168 on the angle member 98. As shown in Figure 4 the first shaft 100 extends outwardly beyond the bevelled gear 165 and carries at its outer end a worm gear 168 and the sprocket 140 for the beater chain 139 is disposed intermediate the two gears 165 and 168. The worm gear 168 meshes with a worm 169 on a longitudinally extending stub shaft 170 suitably journalled in a bracket 171 extending outwardly from the side of the chamber 93 and this shaft 170 carries a sprocket 171 by which the stub shaft 170 and hence the sprocket shafts 100, 101 are driven by the chain 172 from the power shaft 173. Power shaft 173 is conveniently journalled on the chamber 90 and on the filter frame 23 and may carry a drum 174 by which it is belt driven from a motor 175. The filter drum may carry a worm gear 177 meshing with a worm 178 on a filter worm shaft 179 which is driven by suitably proportioned gearing 180 from the power shaft 173. Thus the first shaft 100 drives all of the sprockets 103 in unison and is itself driven in unison with the filter drum 20 from the same power shaft 173 which effects the drive of the filter drum. The chain 139 previously described as effecting the rotation of the beaters 141, 142 is enmeshed with the sprocket 140 on shaft 100 and thus the beaters are also directly driven from the power shaft 173. Obviously other means may be provided for effecting the actuation of the beaters.

The walls of the treating chamber 90 may conveniently be formed of any suitable sheet material. The front wall 183, proximate the filter may terminate short of the bottom to provide a slot 184 through which the chains 45 emerges and similarly a slot may be provided between the front wall portion 185 which overhangs the main wall section 183 and a section of flooring 186 to provide a passage 187 for the entrance of the chains 45 after they leave the sprocket 88. In order to provide ready access to the interior of the drying chamber doors 90 are provided upon opposite sides.

It will thus be seen that a filter cake reenforcement is provided which is capable of travel through a treating chamber by a direct drive from or with a filter drum and whereby the filter cake is caused to pursue a circuitous path without danger of disrupting and becoming free from the reenforcement.

Various modifications will occur to those skilled in the art in the composition and configuration of the various component elements going to make up this apparatus as a whole and it will be obvious that certain of its features are capable of independent use or in combination with other features. No limitation is intended in the phraseology of the foregoing description or illustrations in the accompanying drawings except as indicated in the appended claims.

What I claim is:—

1. In combination with the drum of a rotary drum filter, the outer surface of which is provided with the usual filtering medium, spaced chains adapted to travel around the ends of the drum filter, rods extending between said chains, and sections of relatively coarse wire mesh, for reenforcing the filter cake, carried by the respective rods, of a length extending substantially to an adjacent rod.

2. In combination with the drum of a rotary drum filter, the outer surface of which is provided with the usual filtering medium, spaced chains adapted to travel around the ends of the drum filter, rods extending between the chains, and flexible sections of spirally woven, filter-cake-reenforcing wire, through the meshes of one edge of each of which one of said rods extends, whereby each section of wire is pivotally suspended on its respective rod.

3. A reenforcement for filter cake and the like comprising spaced chains formed of a plurality of links, pivot pins connecting the links, corresponding pins of each chain being of increased length, tubular rods receiving the longer pins and extending between the chains, means to secure the rods and pins together and rectangular sections of perforate reenforcement suspended along one edge from each rod and of a length to extend substantially to an adjacent rod.

4. In a device of the character described, wherein a continuous rotary filter drum rotates in a tank and has formed thereon a filter cake, supporting means encircling a portion of the periphery of the drum, perforate cake reenforcing stripping and conveying section pivotally supported, respectively, from the supporting means, and means to direct said sections into the filter cake after filter cake has formed on the drum.

5. In a device of the character described wherein a continuous rotary filter drum rotates in a tank and has formed thereon a filter cake, supporting means encircling a portion of the periphery of the drum, perforate cake reenforcing stripping and conveying sections pivotally supported, respectively, from the supporting means, and yielding means to direct said sections into the filter cake after filter cake has formed on the drum.

6. In a device of the character described wherein a continuous rotary filter drum rotates in a tank and has formed thereon a filter cake, supporting means encircling a portion of the periphery of the drum, perforate cake reenforcing stripping and conveying sections pivotally supported, respectively from the supporting means, arms pivotally carried with the tank, a roller carried with the arms to press the reenforcement into the filter cake after filter cake has formed, and a counterweight for the roller carried with said arms.

7. In a device of the character described, in combination, a tank, a continuous rotary filter drum rotating in said tank, sprockets carried with the periphery thereof, chains encircling the periphery of the drum and enmeshed with the sprockets, sections of filter reinforcement pivotally suspended from the chains, a drying chamber, sprockets in said chamber with which said chains mesh and a common drive for the filter and the sprockets in the chamber.

8. In a device of the character described, in combination, a plurality of filter cake reenforcements adapted to be embedded in filter cake, said reenforcements hanging at one edge from chains to convey the filter cake from a filter drum to a drying chamber, a plurality of transverse partitions alternately terminating short of the top and bottom of the chamber, sprockets in said chamber with which said chains mesh to direct the reenforcement in a circuitous path between adjacent partitions.

9. In a device of the character described, the combination with a plurality of reenforcement sections mounted to hang on a carrier and convey a deposit from a deposit forming instrumentality to and through a treating chamber therefor, means to free the reenforcement of the deposit comprising rotating members adapted to alternately strike a hanging reenforcement section and give it an undulating motion to cause it to rid itself of deposit.

10. In a device of the character described, in combination, a plurality of filter cake reenforcements adapted to be embedded in filter cake, said reenforcements hanging at one edge from chains to convey the filter cake from a filter drum to a chamber containing a drying medium, means in the chamber to baffle the flow of the medium, and means to direct the deposit in a path conforming substantially to the flow of the medium.

11. In a device of the character described wherein chains convey a deposit from a filter drum to a chamber containing a drying medium, a plurality of cake reenforcing means suspended at spaced intervals by the chains, a plurality of upper sprockets having radii at least as great as the length of a suspended reenforcing means, and a plurality of sprockets in staggered relationship below the first sprockets.

12. In a device of the character described wherein chains convey a deposit from a filter drum to a chamber containing a drying medium, a plurality of cake reenforcing means suspended at spaced intervals by the chains, a plurality of pairs of upper sprockets having radii at least as great as a suspended reenforcing means, a plurality of sprockets in staggered relationship below the first sprockets and of smaller radii, and a cylindrical drum between the pair of certain of the upper sprockets, said drum having a radius substantially equal to the length of a suspended member.

13. Apparatus of the class described, comprising a moving filtering medium upon which filter cake forms, filter cake reenforcing, stripping and conveying means comprising flexible traveling members mounted to travel in proximity to a part of the filtering medium, and further comprising filter cake reenforcing sections carried by and between the flexible traveling members, each section being pivoted along one edge thereof to means carried by the flexible traveling members and traveling therewith, the other edge of the section being free, the sections being adapted to be spaced from the filtering medium during the first part of their travel in proximity thereto, and thereafter to be swung toward the filtering medium and embedded in the filter cake, and means, engageable with said reenforcing sections, to swing said sections into engagement with the cake and embed said sections therein.

14. The combination of a rotary drum type filter, a tank within which the drum rotates in the cake forming zone, filter cake reenforcing and conveying means comprising spaced supporting members encircling the filter drum and from which foraminous sections are pivotally suspended, and a roller to press the sections into the filter cake formed on the drum.

15. The combination of a rotary drum type filter, a tank within which the drum rotates in the cake forming zone, filter cake reenforcing and conveying means comprising spaced flexible supporting members encircling the filter drum in the cake forming zone and from which foraminous sections are pivotally suspended and a pivoted roller in substantial parallel relationship to the drum axis to press the sections into the filter cake formed on the drum.

16. Apparatus of the class described comprising a moving filtering medium upon which filter cake forms, a travelling support extending along at least a portion of the filtering medium, and movable with and with respect to the filtering medium, supporting and guiding means remote from the filtering medium and about which the travelling support changes its direction during its travel away from the filtering medium, and filter cake reenforcing, conveying and stripping means comprising a plurality of openwork and perforate sections pivotally suspended from said travelling support and carried thereby into proximity with the filtering medium, means for effecting the embedding of said openwork and perforate sections in the filter cake for reenforcing it, said reenforcing, conveying and stripping means serving to strip the filter cake from the filtering medium and to carry it away.

17. Apparatus of the class described comprising a moving filtering medium upon which filter cake forms, a travelling support extending along at least a portion of the filtering medium, and movable with and with respect to the filtering medium, supporting and guiding means remote from the filtering medium and about which the travelling support changes its direction during its travel away from the filtering medium, and filter cake reenforcing, conveying and stripping means comprising a plurality of openwork and perforate sections pivotally suspended from said travelling support and carried thereby into proximity with the filtering medium, means for effecting the embedding of said openwork and perforate sections in the filter cake for reenforcing it, said reenforcing, conveying and stripping means serving to strip the filter cake from the filtering medium and to carry it away, said supporting and guiding means comprising means to permit said sections while embedded in filter cake to hang substantially vertically from said travelling support during its change of direction of travel.

In testimony whereof I affix my signature.

FRANK W. YOUNG.